Figure 1:
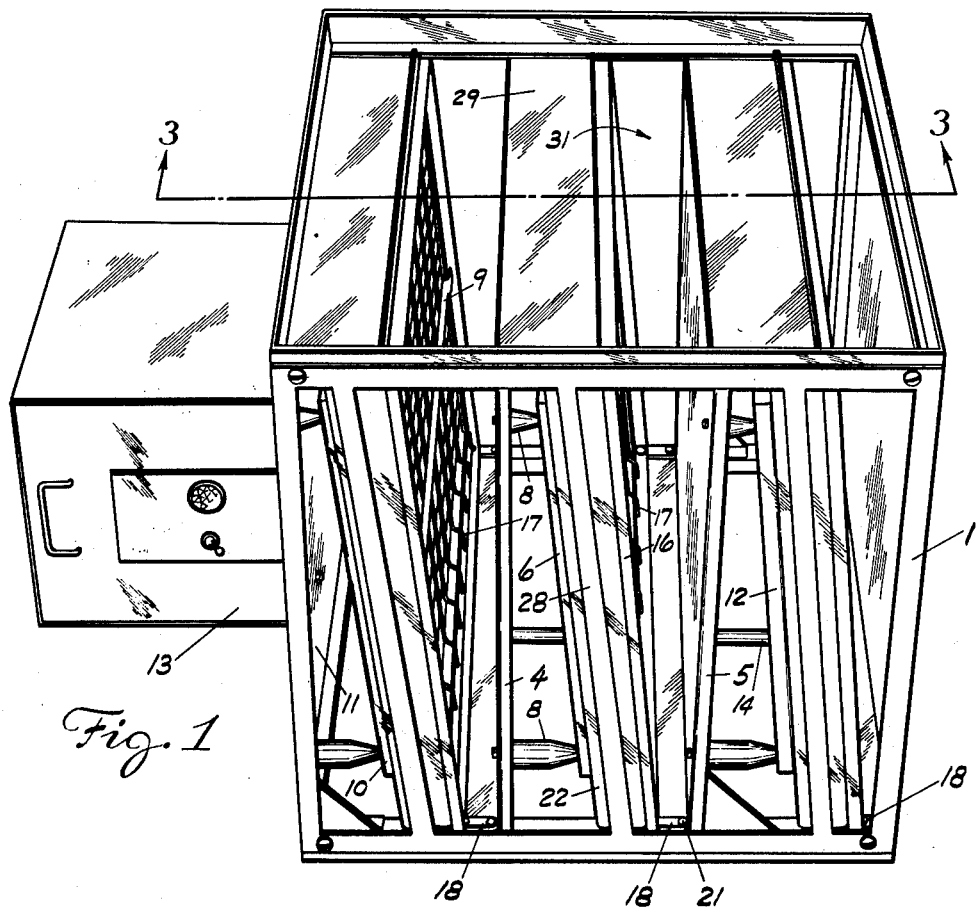

Jan. 3, 1956  R. G. TRUE  2,729,302
ELECTROSTATIC FILTER
Filed Feb. 11, 1949  3 Sheets-Sheet 1

Inventor
RONALD G. TRUE
By Arthur T. Robert
Attorney

Jan. 3, 1956  R. G. TRUE  2,729,302
ELECTROSTATIC FILTER
Filed Feb. 11, 1949  3 Sheets-Sheet 2

Inventor
RONALD G. TRUE

By Arthur Robert
Attorney

Jan. 3, 1956 R. G. TRUE 2,729,302
ELECTROSTATIC FILTER
Filed Feb. 11, 1949 3 Sheets-Sheet 3

Inventor
RONALD G. TRUE

By Arthur J. Robert

Attorney

United States Patent Office 2,729,302
Patented Jan. 3, 1956

2,729,302
ELECTROSTATIC FILTER

Ronald G. True, Louisville, Ky., assignor to American Air Filter Company, Inc., Louisville, Ky., a corporation of Delaware Application February 11, 1949, Serial No. 75,885

20 Claims. (Cl. 183—7)

This invention relates to an electrical air filter of the replaceable cartridge type, such as electrical air filter units adapted to be installed in the cold air supply line of a hot air furnace.

The present invention has for its object, the provision of an electrical air filter which is of simple construction, and exhibits an improved efficiency in removing dust particles from the air.

A further object is the provision of an air filter of this type in which the filter medium can be easily replaced.

Another object is the provision of an effective arrangement for applying an electrical charge to a filter medium of insulation material.

In accordance with the present invention, the filter medium comprises a corrugated sheet of filter material having a conducting coating applied to the crests of the corrugations, the filter medium being disposed between high and low potential grids having wires or rods running transversely to the corrugations and maintained in electrical contact with the coating. In this way the electrostatic field lies substantially entirely in the planes of the folds of the filter medium, and efficient electrostatic separation of dust particles from the air is accomplished.

The invention further contemplates the provision of a simple and convenient arrangement of parts whereby a filter medium can be readily inserted in or removed from the filter housing. For this purpose a suitable filter medium is conveniently preformed in corrugated form into a cartridge in known manner and is coated at the crests of the corrugations with a suitable conducting paste. The high voltage grid may be fixedly supported in the filter housing, and the low voltage grid is movably held in spaced relation thereto by a hinge or pivotal link so that the spacing between the grids may be increased to allow the insertion of a filter cartridge therebetween. The filter cartridge then may be clamped between the grids. Access to the filter cartridge is obtained by means of a removable cover for the housing which, during operation of the filter, covers the opening through which the filter cartridge is inserted or removed.

Figure 2:
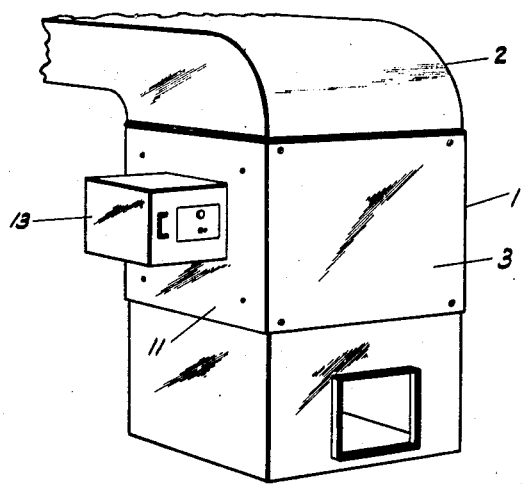
Figure 3:
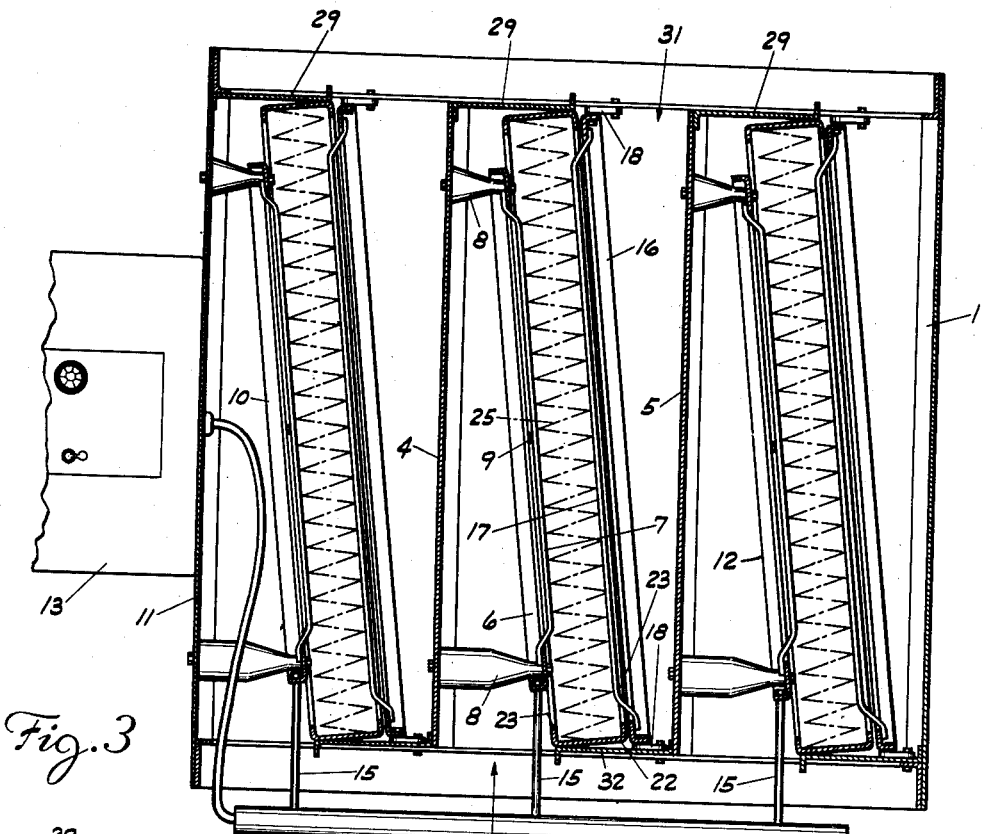
Figure 7:
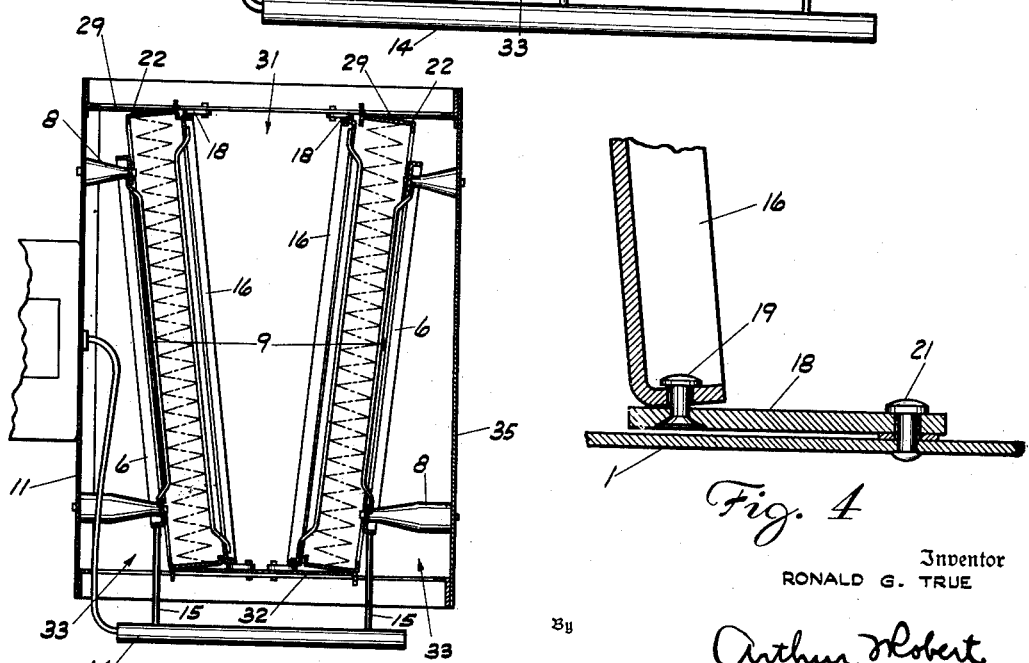
Figure 4:
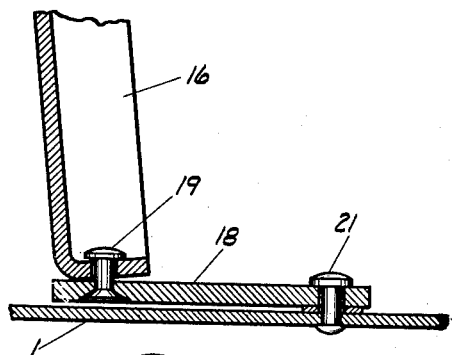
Figure 5:
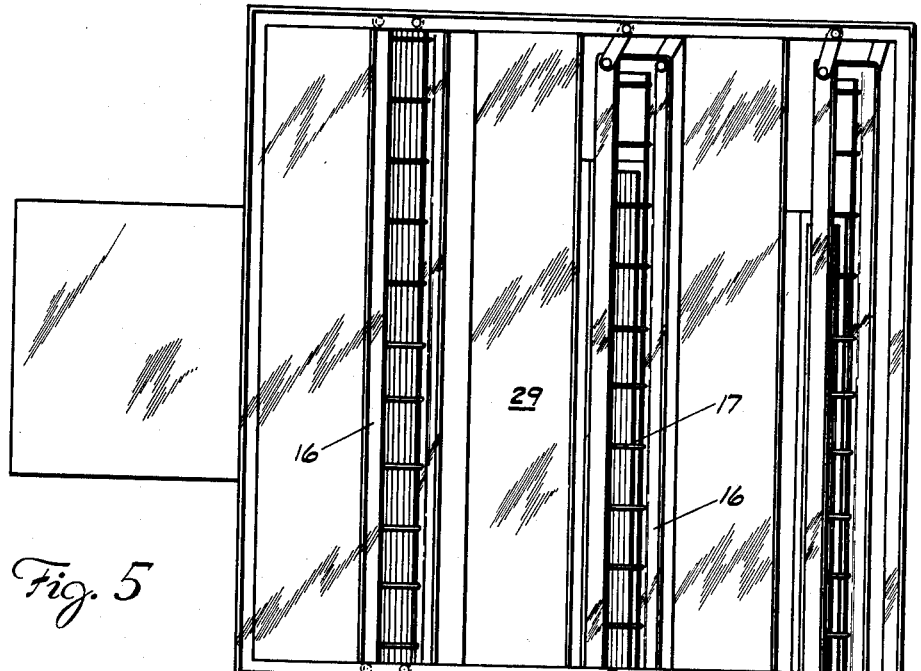
Figure 6:
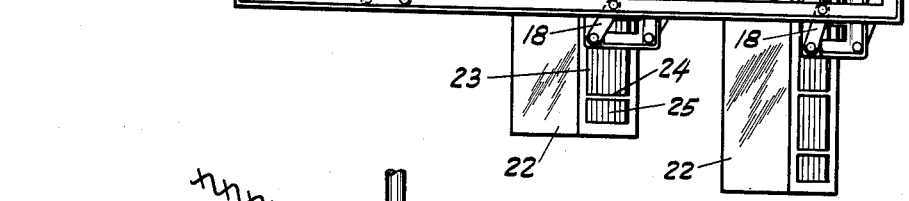
Figure 6:
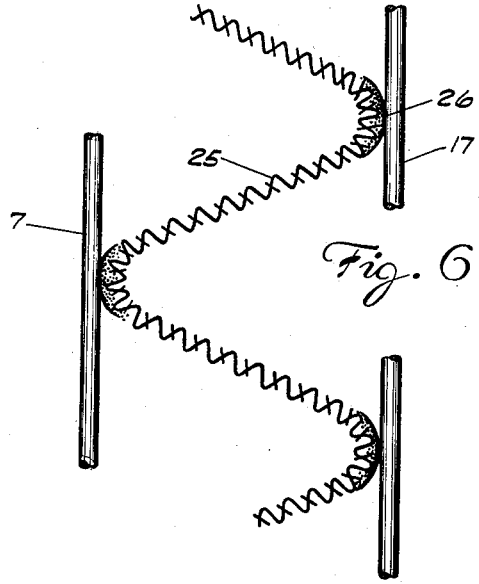

The invention will be described in greater detail in connection with the accompanying drawings which illustrate preferred embodiments of the invention by way of example, and wherein:

Figure 1 is a perspective view of the invention taken from the rear with the end covers removed, Figure 2 is a perspective view showing the filter unit in operative position in an air duct, Figure 3 is a vertical section taken along the lines 3—3 of Figure 1, Figure 4 is a cross-sectional view of a detail on an enlarged scale, Figure 5 is an inversed plan view showing the operation of removing or inserting a filter unit, Figure 6 is a fragmentary sectional view of a filter cartridge, and Figure 7 is a sectional view of a modification.

Referring to the drawings the filter casing 1 is constructed as an angle iron frame covered on two sides by sheet metal and open at its ends. The casing is adapted to be inserted in or form a part of an air duct 2 as shown in Figure 2, which may be the cold air return to a domestic heating furnace, and the casing ends may be closed by suitable sheet metal covers 3 fitting over the open ends when the filter is in operation. The casing is divided into any desired number of filter chambers or units by vertical partitions 4 and 5, three such chambers being shown. A high voltage grid 6 comprising a metal angle iron frame carrying offset vertically extending wires 7 (Figure 3) at suitable intervals, is supported in spaced relation to the casing by suitable insulators 8 secured to the partition 4 so that the grid 6 lies in an inclined position across the middle filter chamber. The wires 7 may be braced near the middle, if desired, by a transverse bracing strip 9 (Figure 3). The left end high voltage grid 10 is similarly supported from the side wall 11 of the casing and the right-hand high voltage grid 12 is likewise supported from the partition 5. Electricity at a suitable potential is supplied by high voltage pack 13 and suitable insulated electrical conductors 14, 15 to the high voltage grids. As the filter chambers are similar in construction and operation, only the middle one will be described in detail.

A similarly constructed low voltage grid 16 having offset vertical grid wires 17 braced by a strip 9 is located in an inclined position parallel to and spaced from the high voltage grid 6. The low voltage grid is carried by links 18, each link being swiveled at one end on a rivet 19 (Figure 4) at each corner of the frame of the low voltage grid and being swiveled at the other end on a pivot 21 in the top and bottom frame members of the casing 1. The links thus provide hinges which enable the low voltage grid 16 to be moved by a parallel sliding motion away from high voltage grid 6 to the inoperative position.

In operative position a filter unit or cartridge 22 is located between the grids. The preferred type of filter cartridge comprises an outer case of cardboard or other suitable non-conducting material open at the sides at 23 except for thin reinforcing strips 24 at the upstream side, and sheet 25 of matted glass wool or other suitable insulating filter material is disposed across the case 22 zig-zag to form corrugations running horizontally. The external peaks on each corrugation are coated with a stripe of conducting coating 26, such as aluminum powder in a resinous vehicle, and the wires or rods 7 and 17 of the high and low voltage grids 6, 16 respectively contact the conducting stripes 26 where they cross, thus providing an electrostatic field in which the lines of force lie substantially in the planes of the folds of the filter medium. The grid wires are offset towards each other so as to extend beyond the edges of the openings 23 and engage the conducting stripes 26. Thus all of the filter medium is subjected to the electrostatic field.

To insert the filter cartridge, the end plate 3, covering the end opposite the foremost end shown in Figures 1 and 2, is removed, and the grounded or low voltage grid 16 is drawn forward thus causing the hinge bars 18 to turn about pivots 21, so that the low voltage grid moves forward and away from the high voltage grid in a parallel low voltage and high voltage grids so that the used filter cartridge may be readily removed. A new cartridge then is inserted at one end, the stop bars 28 at the other end serving to stop the cartridge at the end of the insertion movement and thus position the cartridge. Upon insertion of the new cartridge the low voltage grid is pushed back, thus moving the grid with a similar parallel sliding motion into engagement with the conducting stripes 26 and clamping the cartridge 22 between the high and low voltage grids. The insertion end cover 3 then may be replaced. It will be understood that the power to the high voltage grid should be cut off before removing the cover, and that the cover is provided with a suitable safety switch which short circuits the high voltage grid to the frame upon removal of end cover 3. In the event the power to the high voltage grid is not first cut off, the short circuiting of the grid and frame causes operation of an overload relay which cuts off the voltage to the high voltage grid.

At the top a baffle wall 29 extends laterally from the partition 4 into covering relation with the top of the filter cartridges 22, and thus downwardly flowing air is directed through the opening 31 into the filter chamber. At the bottom a similar baffle or plate 32 extends from the partition 5 into covering relation with the bottom of the filter cartridge to provide an exit opening 33. Thus air entering the opening 31 flows in a generally lateral direction through the filter cartridge 22 and exits through opening 33 at the bottom.

The modification illustrated is adapted to be operated at a potential difference of about ten thousand volts direct current between the high potential and grounded grids, and the wires or rods in each grid are about one eighth inch diameter and are spaced about one and one eighth inches on each grid. The conducting coating 26 on the corrugated filter sheet contacts the wires of the high potential and grounded grids so that an electrostatic field is provided in which the lines of force lie directly in line with the folds of the filter medium, and are substantially confined thereto, so that the whole filter medium is subjected to the field. This results in an improved operating efficiency of the filter.

The operation of the invention now will be described. Air in duct 2 flows downwardly and is divided by baffles 29 into three streams which enter through the respective openings 31, flow laterally through the respective filter cartridges 22, and exit downwardly through the openings 33 between the baffles 32. In passing through the filter medium dust, smoke particles or grease particles are retained by the filter, the separation of such particles being accomplished with an improved efficiency due to the disposition of the electrostatic field substantially entirely in line with the folds of the filter medium. When a filter cartridge becomes laden with deposits of dust, it may be replaced by removing end plate 3, withdrawing the grounded grid 16 which pivots about pivots 21 to move away from and release the cartridge 22. The cartridge then may be withdrawn, a new cartridge substituted, and the grounded grid then returned to its place, after which the cover is replaced.

In the modification shown in Figure 7, wherein like parts are designated by like reference numerals, the casing 1 has two high voltage grids 6 oppositely inclined and carried on insulators 8 secured to the side walls 11 and 35. The two grounded grids 16 are carried in the housing by links 18 and receive the filter cartridges 22 between the respective high voltage and grounded grids. At the top baffles 29 extend from the side walls 11 and 35 to provide a middle opening 31, while at the bottom a middle baffle 32 provides exit openings 33. In this modification the downward flow of air entering at 31 divides laterally to flow through the two filter units and the divided streams issuing from exits 33 reunite in the lower portion of the air duct. The operation of removing or replacing the filter cartridge is the same as previously described.

It will be understood that the rods of the grids need not be disposed at right angles to the corrugations of the filters, but may lie oblique thereto. The invention may be embodied in other specific forms without departing from the spirit or scope thereof.

I claim as my invention:

1. An electrostatic filter comprising: an air flow housing having an air cleaning chamber adapted to receive a dielectric filter cell in position to clean the air passing through the chamber; a pair of electrostatic cell-charging grids of opposite electrical sign arranged within said chamber, one on each side of the space provided for said cell; means mounting said grids on said housing for movement relatively toward and away from each other to grip and release a cell arranged between them, said mounting means including means for electrically insulating one grid from the other; and means for connecting the grids to an electrical supply line to impose a difference of electrical potential between them.

2. An electrostatic filter as specified in claim 1 in combination with a corrugated filter cell of dielectric material, and wherein each grid comprises spaced parallel rods mounted on a frame, the rods of one grid being parallel to the rods of the other grid.

3. An electrostatic filter comprising: a housing adapted to be positioned in an air stream and having partitions forming filter chambers; each filter chamber having a high voltage grid comprising a rectangular frame and offset rods across the frame; insulators secured on a partition and supporting said high voltage grid in a filter chamber; a low voltage grid comprising a rectangular frame and offset rods parallel to the high voltage grid rods; means on said housing carrying said low voltage grid for movement to and from the high voltage grid; a filter member comprising a web of dielectric material corrugated transversely of said grid rods and coated on the exterior crests with a conducting composition, said filter member being received between said grids with the grid rods in contact with the coated crests.

4. An electrostatic filter comprising: a housing adapted to be positioned in an air stream and having partitions forming filter chambers; each filter chamber having a high voltage grid comprising a rectangular frame and offset rods across the frame; insulators secured on a partition and supporting said high voltage grid in inclined position in a filter chamber; a low voltage grid comprising a rectangular frame and offset rods parallel to the high voltage grid rods; a plurality of links pivoted to said frame and said housing; a filter member comprising a web of dielectric material corrugated transversely of said grid rods and coated on the exterior crests with a conducting composition, said filter member being received between said grids with the grid rods in contact with the coated crests.

5. An electrostatic filter comprising: an open side housing adapted to be positioned in an air stream and having vertical partitions forming filter chambers; each filter chamber having a high voltage grid comprising a rectangular frame and vertical offset rods across the frame; insulators secured on a partition and supporting said high voltage grid in inclined position in a filter chamber; a low voltage grid comprising a rectangular frame and vertical offset rods; a plurality of links pivoted to said frame and said housing supporting the low voltage grid for pivotal movement on a vertical axis; a filter member comprising a web of dielectric material corrugated transversely of said grid rods and coated on the exterior crests with a conducting composition, said filter member being received between said grids with the grid rods in contact with the coated crests.

6. An electrostatic filter comprising: a housing adapted to be positioned in an air stream and having partitions forming filter chambers; each filter chamber having a high voltage grid comprising a rectangular frame and vertical offset rods across the frame; insulators secured on a partition and supporting said high voltage grid in inclined position in a filter chamber; a baffle at the ends of each partition to direct flow of air through said grid; a low voltage grid comprising a rectangular frame and offset rods parallel to the high voltage grid rods; means pivotally carrying the low voltage grid for movement toward and away from the high voltage grid; a filter member comprising a web of matted dielectric material corrugated transversely of said grid rods and coated on the exterior crests with a conducting composition, said filter member being received between said grids with the grid rods in contact with the coated crests.

7. In an electrostatic filter: a corrugated web of porous dielectric material having a coating of a conducting material at the opposite sides in stripes parallel to the corrugations; and electrical contact members comprising rods extending transversely of the coating stripes and in contact therewith.

8. A filter cartridge for an electrostatic filter comprising: a corrugated web of porous dielectric material having a coating of a conducting material in stripes on the exterior crests of the corrugations to provide electrical contact elements.

9. An electrostatic filter comprising: a housing arranged to accommodate an air flow therethrough; a high voltage grid comprising spaced parallel rods disposed within the housing transversely of the air flow therethrough; a low voltage grid disposed within the housing adjacent said high voltage grid but in spaced relation thereto and comprising spaced parallel rods extending in the same direction as the rods of the high voltage grid; and a corrugated sheet of dielectric filter medium between said grids, the corrugations of the sheet extending transversely of the grid rods and having a conducting coating at the apexes in electrical contact with the grid rods.

10. An electrostatic filter as specified in claim 1 wherein: said one grid is stationarily mounted; and said other grid is mounted for said movement.

11. A filter cartridge for an electrostatic filter comprising: an outer case of nonconducting material open at opposite sides; and a corrugated sheet of porous dielectric material having the exterior crests of the corrugations exposed by said open sides, the exterior crests being coated with a conducting material to provide electrical contact elements.

12. An electrostatic filter comprising: a housing adapted to be positioned in an air stream; a high-voltage grid comprising a rectangular frame and offset rods across the frame; insulators carried by the housing and supporting said high-voltage grid in a filter chamber; a low-voltage grid comprising a rectangular frame and offset rods parallel to the high-voltage grid rods; means in said housing carrying said low-voltage grid for movement toward and from the high-voltage grid; and a filter member comprising a corrugated web of dielectric material having its corrugations coated on their exterior crests with a conducting material, said filter member being received between said grids with the grid rods in contact with the coated crests.

13. An electrostatic filter comprising: a housing having an air cleaning chamber, air inlet and outlet openings at opposite ends of the chamber to accommodate a flow of air through the chamber and an access opening at one side of the chamber to facilitate the insertion into and removal from the chamber of a dielectric filter cartridge; means mounted within the housing in position to receive an inserted cartridge and hold it removably in position to clean air passing through said chamber; electrodes of opposite electrical sign mounted in the housing on opposite sides of the space occupied by said cartridge, said electrodes being operative when electrically energized to create an electrical field in said space; means for closing said access opening; and means for connecting said electrodes to a power supply.

14. An air cleaner comprising: a housing having an open-ended air flow chamber and a normally closed access opening at one side of said chamber; a dielectric filter cell operatively positioned within the housing to clean the air passing therethrough and insertable into and removable from said operative position through said access opening; a pair of electrodes arranged within the chamber, one on each side of the space provided for said cell; means mounting said electrodes on said housing for movement within the housing relatively toward and away from each other to grip and release a cell positioned between them, said mounting means including means for electrically insulating one electrode from the other; and means for connecting the electrodes to an electrical supply line to impose a difference of electrical potential between them and electrostatically charge said cell.

15. An air cleaning medium comprising: a unitary dielectric web of porous air cleaning dielectric substance presenting an air cleaning area; and means, operative when electrically connected to a power supply, to distribute an electrostatic charge on said web over said area, said means including a series of spaced substantially parallel lines of electrically conductive material incorporated in said web to extend individually along said area and collectively across said area, the alternate lines and the intermediate lines being adapted for electrical connection respectively to opposite sides of an electric power supply, wherein said web is corrugated to present a series of exterior crests on each of the opposite faces of said area; successive alternate lines extend along successive crests on the upstream face of said area; and successive intermediate lines extend along successive crests on the downstream face of said area.

16. An electrostatic air cleaner comprising: a housing having an open ended air flow chamber and a normally closed access opening at one side of the chamber; a dielectric filter medium operatively positioned within said housing chamber to clean air passing therethrough and insertable into and removable from said operative position through said housing access opening, said medium comprising a unitary dielectric web of porous air cleaning dielectric substance presenting an air cleaning area and having a series of spaced substantially parallel lines of electrically conductive material incorporated in it to extend individually along said area and collectively across said area, the alternate lines and the intermediate lines being adapted for electrical connection respectively to opposite sides of an electric power supply.

17. The cleaner of claim 16 wherein: electrode means are mounted within the chamber in position to connect the alternate lines of said web to one side of an electric power supply and the intermediate lines to the opposite side thereof.

18. The cleaner of claim 16 wherein: said web is corrugated to present a series of exterior crests on each of the opposite faces of said area; successive alternate lines extend along successive crests on the upper stream face of said area and successive intermediate lines extend along successive crests on the down stream face of said area.

19. The cleaner of claim 18 wherein: a pair of electrodes is mounted within the chamber, one located on each side of said web in position to connect electrically with the adjacent lines of said web.

20. An air filter medium for an electrostatic filter comprising: a web of porous, air permeable dielectric material adapted to be positioned across a stream of air to be filtered; and a coating of an electricity-conducting material on said web in the form of multiple, substantially parallel stripes dividing said web into multiple air cleaning areas of porous dielectric material between stripes; and the stripes being adapted for electrical connection in alternate relation to opposite sides of a high voltage electric power supply, and serving, when so connected, to distribute an electrostatic charge over said multiple dielectric areas of said web; whereby said multiple areas of the web, when positioned as herein stated, act as mechanical separators for suspended matter in said air stream, and the electrostatic field produced by said connections to a power supply, further acts to attract and retain charged particles of suspended matter thereon.

References Cited in the file of this patent

UNITED STATES PATENTS

| Number | Name | Date |
|---|---|---|
| 1,059,253 | Wimbush | Apr. 15, 1913 |
| 1,566,607 | Jordahl | Dec. 22, 1925 |
| 1,990,110 | Bridges | Feb. 5, 1935 |
| 2,013,038 | Dollinger | Sept. 3, 1935 |
| 2,058,669 | Dollinger | Oct. 27, 1936 |
| 2,064,651 | Fiene | Dec. 15, 1936 |
| 2,297,601 | Williams | Sept. 29, 1942 |
| 2,408,158 | Belsher | Sept. 24, 1946 |
| 2,637,766 | Grouse | May 5, 1953 |